Dec. 1, 1925.　　　　　　　　　　　　　　　　　　1,563,465
A. L. BREITENSTEIN
ATTACHMENT FOR MOLD ENGRAVING MACHINES
Filed March 19, 1923　　　3 Sheets-Sheet 1
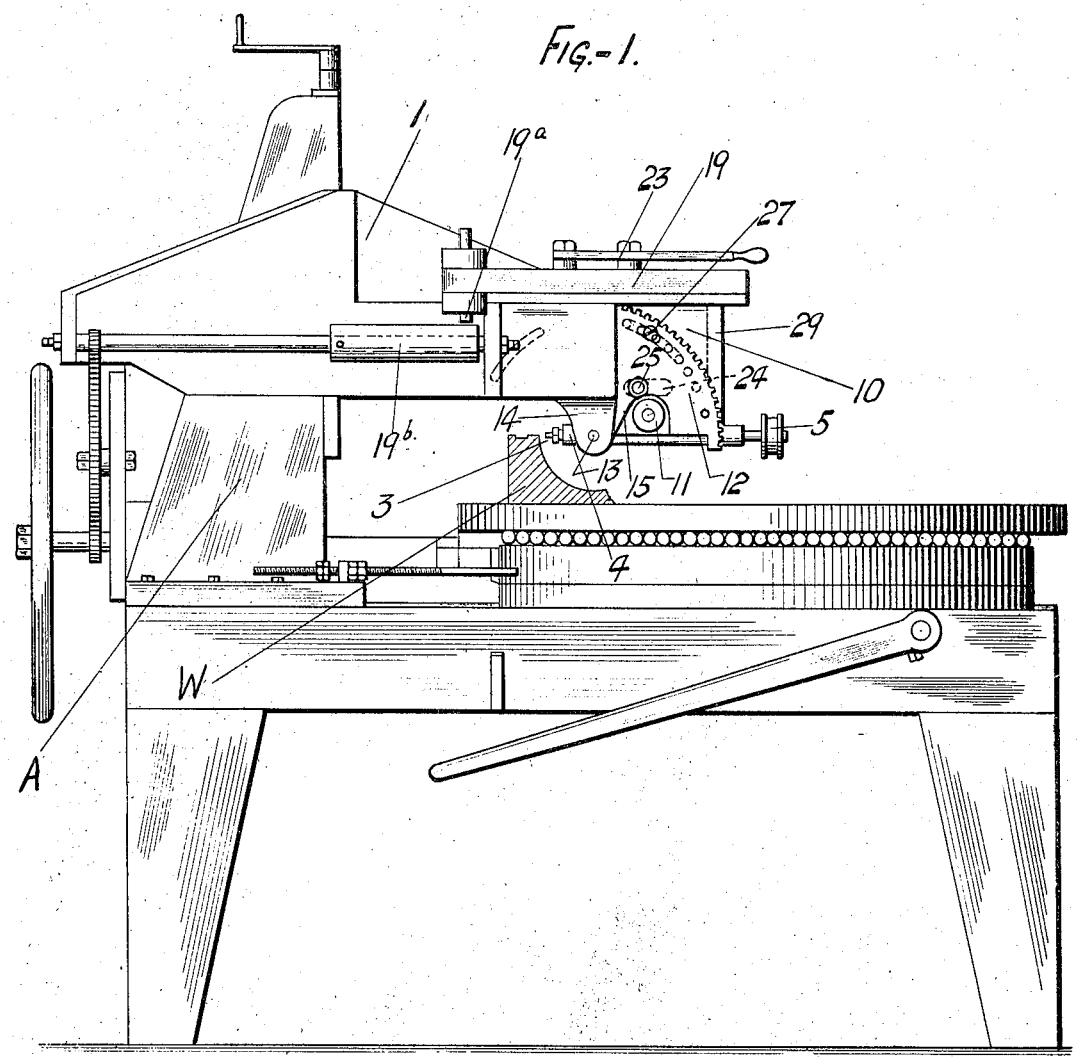
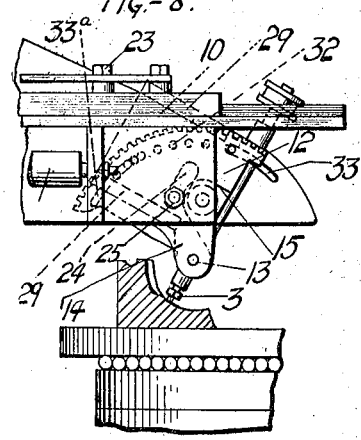
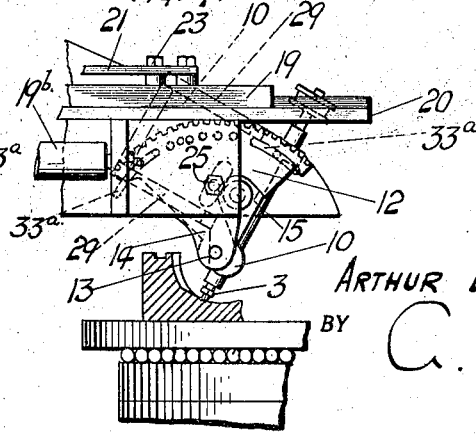
INVENTOR.
ARTHUR L. BREITENSTEIN.
BY
ATTORNEY.

Dec. 1, 1925.
A. L. BREITENSTEIN
1,563,465
ATTACHMENT FOR MOLD ENGRAVING MACHINES
Filed March 19, 1923     3 Sheets-Sheet 2
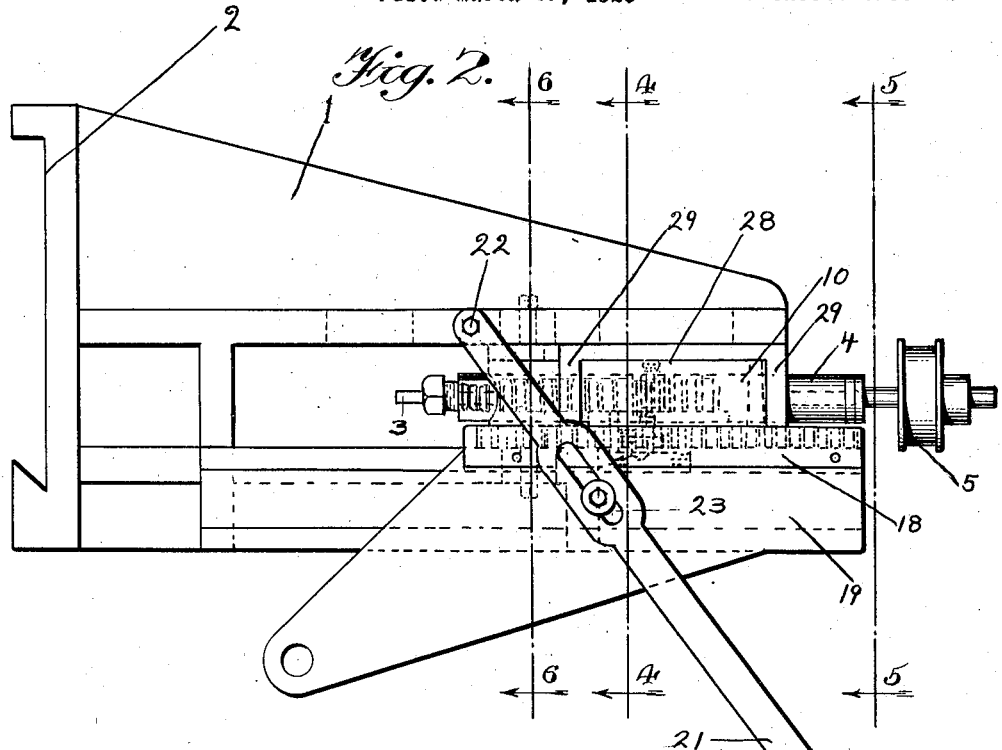
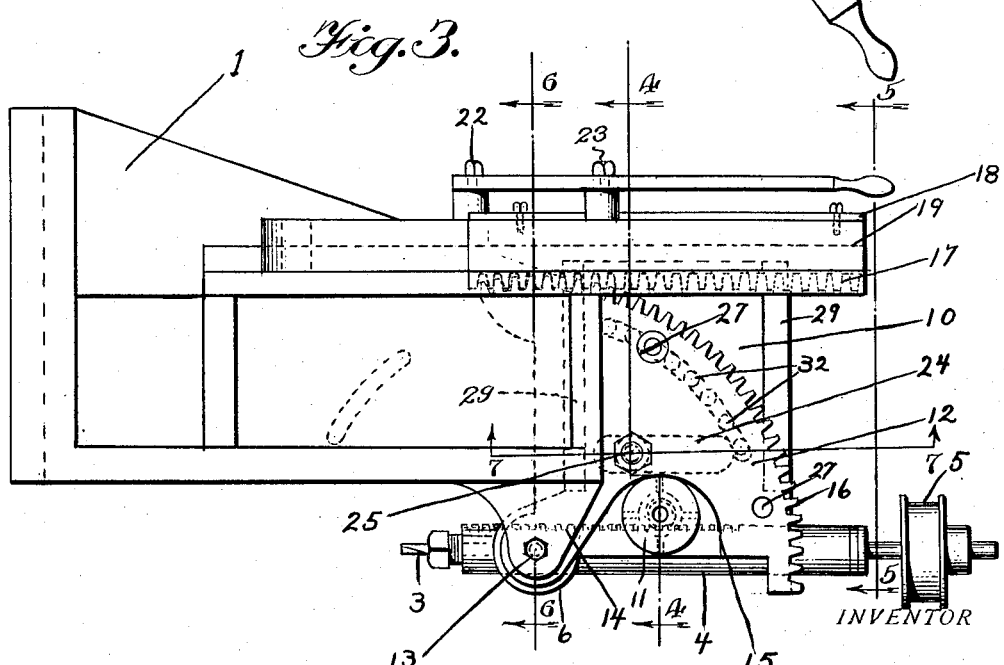
INVENTOR
Arthur L. Breitenstein
BY
A. L. Ely
ATTORNEY Dec. 1, 1925.   1,563,465
A. L. BREITENSTEIN
ATTACHMENT FOR MOLD ENGRAVING MACHINES
Filed March 19, 1923   3 Sheets-Sheet 3
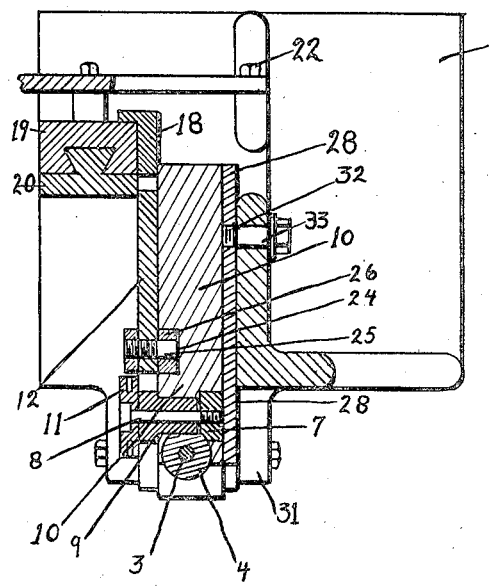
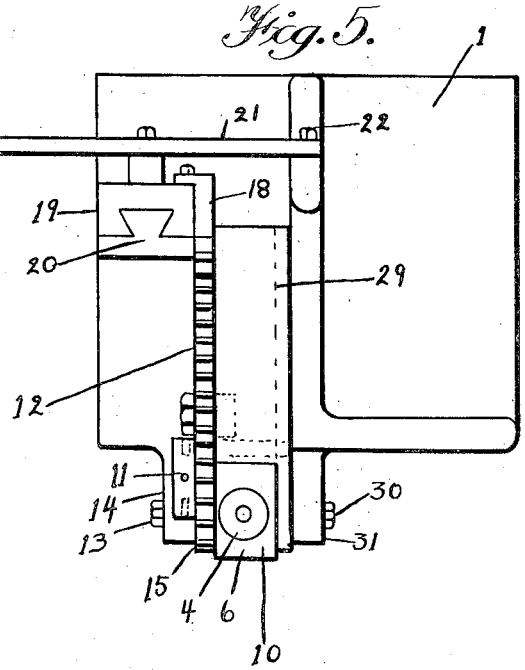
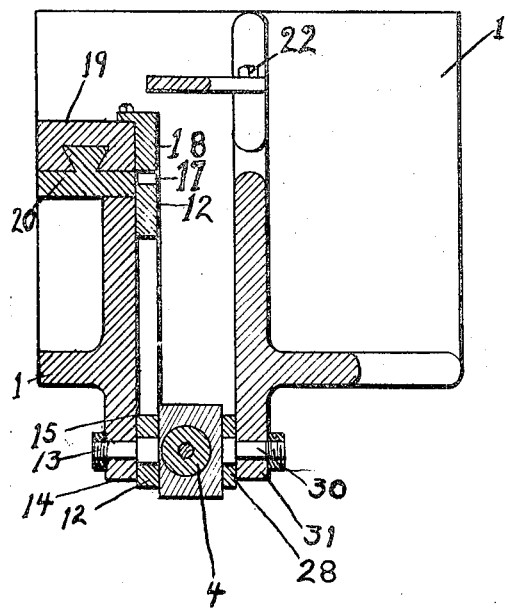
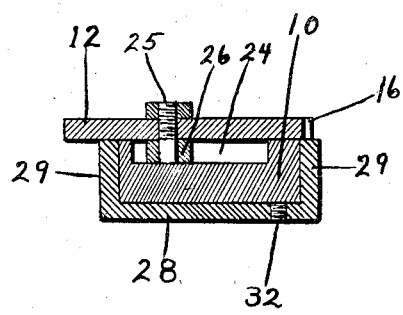

Patented Dec. 1, 1925.

1,563,465

UNITED STATES PATENT OFFICE.

ARTHUR L. BREITENSTEIN, OF AKRON, OHIO.

ATTACHMENT FOR MOLD-ENGRAVING MACHINES.

Application filed March 19, 1923. Serial No. 626,175.

*To all whom it may concern:*

Be it known that I, ARTHUR L. BREITENSTEIN, a citizen of the United States, residing at Akron, county of Summit, State of Ohio, have invented certain new and useful Improvements in Attachments for Mold-Engraving Machines, of which the following is a specification.

This invention relates to machines such as used in the engraving of transversely curved surfaces and particularly the inner surfaces of tire molds such as used in the vulcanization of pneumatic tires.

The particular object of the invention is the provision of a cutter or tool carrying head which is easily adjustable so that it will operate to cut in a radius or to cut on a straight line at any angle to the plane of the work, the head being adapted to be mounted on known types of engraving machines such as the one disclosed in the prior patent of the present inventor, No. 1,505,579, dated August 19, 1924.

Mold engraving machines of the general type described are well known, but prior to my invention it has apparently been impossible to combine mechanism whereby the same tool carrier and operating mechanism may be easily adjusted to cut on a curve or on a straight line, in a manner as simple and efficient as that shown herein.

In the drawings accompanying and forming a part of this application, there is shown one form of my invention as it is carried out with a suitable form of tool carrying head. It is to be understood that the invention is not limited to the specific form thereof as shown and described.

In the drawings:

Figure 1 is a side elevation of a machine having a head constructed according to the invention mounted thereon;

Figure 2 is a plan view of the head;

Figure 3 is a side elevation thereof;

Figure 4 is a section on the lines 4—4 of Figures 2 and 3;

Figure 5 is a section on the lines 5—5 of the same figures;

Figure 6 is a section on the lines 6—6 thereof;

Figure 7 is a section on the line 7—7 of Figure 3;

Figure 8 is a side elevation of the head illustrating the manner of using the machine for making angular cuts; and Figure 9 is a similar side elevation illustrating how the tool carrying plate is advanced by the sector plate to make the angular cut.

The head of the machine is indicated by the numeral 1, being provided on its rear face with a vertical guideway 2 by which it is supported and guided in vertical movement on the base or standard of the machine A. The head extends over the work W and supports the cutting tool 3 which is adjustably secured in a barrel or holder 4 and rotated in any suitable manner, as, for example, by the pulley 5.

The tool is carried in bearings 6 in the forward portion of a central plate 10 and is movable longitudinally therein, being clamped in position by a nut 7 which is drawn into clamping relation to the barrel 4 by a screw threaded pin 8 which is carried in a sleeve 9 on the plate 10 and operated by a knob 11.

On one side of the central plate 10 is located a pivoted or sector plate 12. This plate which is substantially in the form of a quarter of a circle is pivotally supported on a pin 13 mounted in an ear or depending lug 14 on the under side of the head 1. The sector plate is cut away, as at 15, to clear the knob 11 and is provided on its outer periphery with the curved rack or gear section 16.

The curved rack 16 is in mesh with a straight rack 17 formed on the under side of a plate 18 which is secured to a longitudinally movable slide 19 mounted on a rib 20 on the upper surface of the head 1. The slide 19 is moved to and fro by a lever 21 which is pivoted at 22 on the head and is provided with a pin-and-slot connection 23 with the slide 19. The slide 19 is designed to carry the usual pattern follower or stylus as is common with this type of machine. The stylus 19ª cooperates with a pattern 19ᵇ by which movement of the slide 19 may be governed, as described and claimed in Patent Number 1,505,579, granted August 19, 1924, to the present inventor.

On the side of the central plate 10 is formed a straight groove or slot 24 and projecting through the sector plate is a pin 25, the inner end of which carries a dog or slide 26 received in the groove. The sector plate and the central plate may be connected together by pins or bolts 27 shown in Figure 1.

On the side of the central plate 10 opposite the sector plate, is a third or guide plate 28 which is formed with two parallel flanges 29 which embrace the side of the central or tool carrying plate 10. The guide plate 28 is pivoted at 30 on the same axis as the sector plate in a lug 31 extending downwardly from the head of the machine.

The guide plate 28 is provided with a plurality of holes 32 arranged in an arc about the center 13—30 and a pin 33 may be projected through arcuate slots 33ª, 33ª in the head and received in any one of the holes 32. It will be seen that by the arrangement described, the guide plate 28 can be set at any angle desired.

The operation of the machine will be readily understood from the following description.

When it is desired to cut on a curve or radius, the sector plate 12 is fastened to the central or tool carrying plate by the pins or screws 27 and the pin 33 is removed so that guide plate 28 can move with the plate 10 and the sector and thus the three parts will pivot as a unit. Operation of the handle 21 will accordingly rock the tool carrier about the pivot 13—30. If it is desired to cut at an angle, the pins 27 are withdrawn, thereby releasing plate 10 from travel with the sector, and the pin 33 is placed through one slot 33ª and in the proper hole 32 to secure the guide plate 28 to the head at the angle desired. Operation of the lever 21, through the pin and slot connection 24 and 26, now translates the pivotal movement of the sector plate 12 into a movement of the central plate 10 in a straight line on the guide plate 28.

It will thus be seen that an extremely simple and efficient mechanism has been provided whereby the tool can be rocked about its center or with a simple adjustment the tool can be moved in a straight line at any angle, the same actuating mechanism being used in both cases.

It is obvious that, having explained the principles of my invention in order to enable a person skilled in the art to practise them, I am not necessarily confined to the detailed construction herein shown, but am entitled to a broad range of equivalents within the scope of the invention and the claims hereto appended.

What I claim is:

1. In a mold engraving machine, a tool carrying plate, a pivotal support for said plate and a rectilinear guide for said plate, an actuating lever, and means whereby said lever may be employed to move the plate about the pivot or on said guide selectively.

2. In a mold engraving machine, a tool carrying plate, a pivoted plate adjacent the tool plate, means to rock the plate about its pivot, and mechanism whereby the pivoted plate may be selectively employed to rock the tool carrying plate or to move the tool carrying plate along a straight line.

3. In a mold engraving machine, a tool carrying plate, a pivoted plate at one side of the tool carrying plate, a second pivoted plate at the opposite side thereof, and means to move one of said plates about its pivot either with or independently of the other plate.

4. In a mold engraving machine, a tool carrying plate, a sector plate at one side and a guide plate at the other side of the tool carrying plate, said sector plate and guide plate being independently movable about a common axis, and means adapted to connect the tool carrying plate for pivotal movement with the other plates about the axis thereof or for rectilinear movement on the guide plate.

5. In a mold engraving machine, a head, a tool carrying member located in said head, and a single actuating means for moving the tool carrying member selectively about a center or in a non-radial straight line.

6. In a mold engraving machine, a head, a tool carrying member located in said head, and a single actuating means adapted to move the tool carrying member selectively about a center or in a non-radial straight line at various angles.

7. In a mold engraving machine, a head, a tool carrying member located in said head, a lever pivotally mounted on said head, and means to convert the movement of the lever into an arcuate movement or a non-radial rectilinear movement of the member, selectively.

8. In a mold engraving machine, a head, a tool carrying member located in said head, a lever pivotally mounted on said head, and means to convert the movement of the lever into an arcuate movement of the member or a non-radial rectilinear movement thereof at various angles, selectively.

9. In a mold engraving machine, a head, a pivoted sector plate, a pivoted guide plate having a rectilinear guide therein, a tool carrying plate slidably mounted on the guide, the sector plate being provided with means to lock it to the tool carrying plate, and the guide plate having means to lock it to the head.

10. In a mold engraving machine, a head, a pivoted sector plate, a pivoted guide plate having a rectilinear guide therein, a tool carrying plate slidably mounted on the guide, the sector plate being provided with means to lock it to the tool carrying plate, and the guide plate having means to lock it to the head at various angles.

11. In a mold engraving machine, a head, a pivoted sector plate, a pivoted guide plate having a rectilinear guide therein, a tool carrying plate slidably mounted on the guide, a pin and slot connection between the sector plate and the tool carrying plate, the sector plate being provided with means to lock it to the tool carrying plate, and the guide plate having means to lock it to the head.

12. In a mold engraving machine, a head, a pivoted sector plate, a pivoted guide plate having a rectilinear guide therein, a tool carrying plate slidably mounted on the guide, a pin and slot connection between the sector plate and the tool carrying plate, the sector plate being provided with means to lock it to the tool carrying plate, and the guide plate having means to lock it to the head at various angles.

13. In a mold engraving machine, a head, a pivoted sector plate, a pivoted guide plate having a rectilinear guide therein, a tool carrying plate slidably mounted on the guide, a pin and slot connection between the sector plate and the tool carrying plate, the sector plate being provided with means to lock it to the tool carrying plate, and the guide plate having means to lock it to the head, and a lever mechanism connected to said sector plate to rock it about its pivot.

14. In a mold engraving machine, a head, a pivoted sector plate, a pivoted guide plate having a rectilinear guide therein, a tool carrying plate slidably mounted on the guide, a pin and slot connection between the sector plate and the tool carrying plate, the sector plate being provided with means to lock it to the tool carrying plate, and the guide plate having means to lock it to the head at various angles, and a lever mechanism connected to said sector plate to rock it about its pivot.

15. A machine for engraving annular objects comprising in combination, an oscillatable support for the object, a movable tool fulcrumed to cut transversely of the object, means for moving the tool to cut in an arcuate path, and means adapted to be selectively employed to cut along a straight line at an angle to the perpendicular.

16. A machine for engraving annular objects comprising in combination, an oscillatable support for the object, a movable tool fulcrumed to cut transversely of the object, means operable to move the tool to cut in an arcuate path, means operable to move the tool in a straight path, and means common to said first and second means operable to actuate selectively either of said means.

A. L. BREITENSTEIN.